(12) United States Patent
Rivas et al.

(10) Patent No.: US 12,383,827 B2
(45) Date of Patent: Aug. 12, 2025

(54) CLOUD GAMING COMPUTING DEVICE

(71) Applicant: Google LLC, Mountain View, CA (US)

(72) Inventors: Diego Rivas, San Francisco, CA (US); Sanjay Nathwani, Fremont, CA (US); Zachary Daniel Alcorn, Denver, CO (US)

(73) Assignee: GOOGLE LLC, Mountain View, CA (US)

( * ) Notice: Subject to any disclaimer, the term of this patent is extended or adjusted under 35 U.S.C. 154(b) by 303 days.

(21) Appl. No.: 17/899,837

(22) Filed: Aug. 31, 2022

(65) Prior Publication Data
US 2024/0066397 A1 Feb. 29, 2024

(51) Int. Cl.
- *A63F 13/24* (2014.01)
- *A63F 13/355* (2014.01)
- *A63F 13/358* (2014.01)
- *A63F 13/533* (2014.01)

(52) U.S. Cl.
CPC .......... *A63F 13/358* (2014.09); *A63F 13/355* (2014.09); *A63F 13/533* (2014.09); *A63F 2300/308* (2013.01); *A63F 2300/534* (2013.01); *A63F 2300/538* (2013.01)

(58) Field of Classification Search
CPC .... A63F 13/358; A63F 13/355; A63F 13/533; A63F 2300/309; A63F 2300/534; A63F 2300/538
See application file for complete search history.

(56) References Cited

U.S. PATENT DOCUMENTS

| | | |
|---|---|---|
| 6,646,652 B2 | 11/2003 | Card et al. |
| 2008/0180382 A1 | 7/2008 | Hao et al. |
| 2012/0260179 A1* | 10/2012 | Reshadi ............... G06F 9/5061 715/735 |
| 2015/0220245 A1 | 8/2015 | Wojcik et al. |
| 2017/0032909 A1 | 2/2017 | Chen |
| 2018/0004456 A1 | 1/2018 | Talwar et al. |
| 2018/0350150 A1 | 12/2018 | Powderly et al. |
| 2019/0059388 A1* | 2/2019 | Watts .................... A01N 25/08 |
| 2019/0321725 A1* | 10/2019 | Zimring ............... A63F 13/355 |
| 2019/0361543 A1 | 11/2019 | Zhang |
| 2020/0241945 A1* | 7/2020 | Sterioff ............... G06F 11/0787 |
| 2020/0298108 A1* | 9/2020 | Phaneuf ................ A63F 13/35 |
| 2020/0384369 A1* | 12/2020 | Holmes .................. A63F 13/86 |
| 2021/0146240 A1* | 5/2021 | Colenbrander ....... A63F 13/335 |
| 2021/0406066 A1 | 12/2021 | Shveidel et al. |
| 2022/0370902 A1* | 11/2022 | Szymanik ............. A63F 13/77 |

* cited by examiner

*Primary Examiner* — David L Lewis
*Assistant Examiner* — Shauna-Kay Hall
(74) *Attorney, Agent, or Firm* — Botos Churchill IP Law LLP

(57) ABSTRACT

The technology provides a computing device and method of operation that includes receiving, by the computing device, content from a remote service. The method identifies a latency issue associated with the content, and determines a set of diagnostic options based on information about the content and the latency issue. The set of diagnostic options identifies at least one of network information or display information. The method includes generating, for presentation on a display device via a graphical user interface, a notification indicating the latency issue and the set of diagnostic options. The notification includes an option to access the set of diagnostic options in order to address the latency issue.

23 Claims, 19 Drawing Sheets

100

200

300

400

500

600

620

640

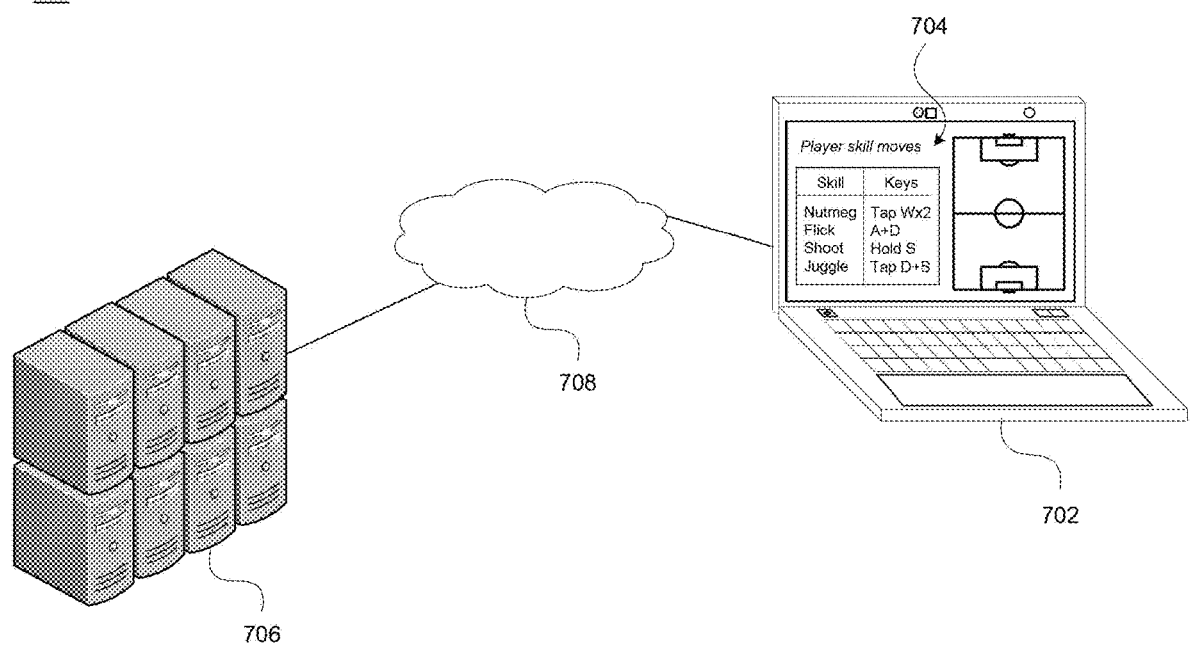

800

820

840

900

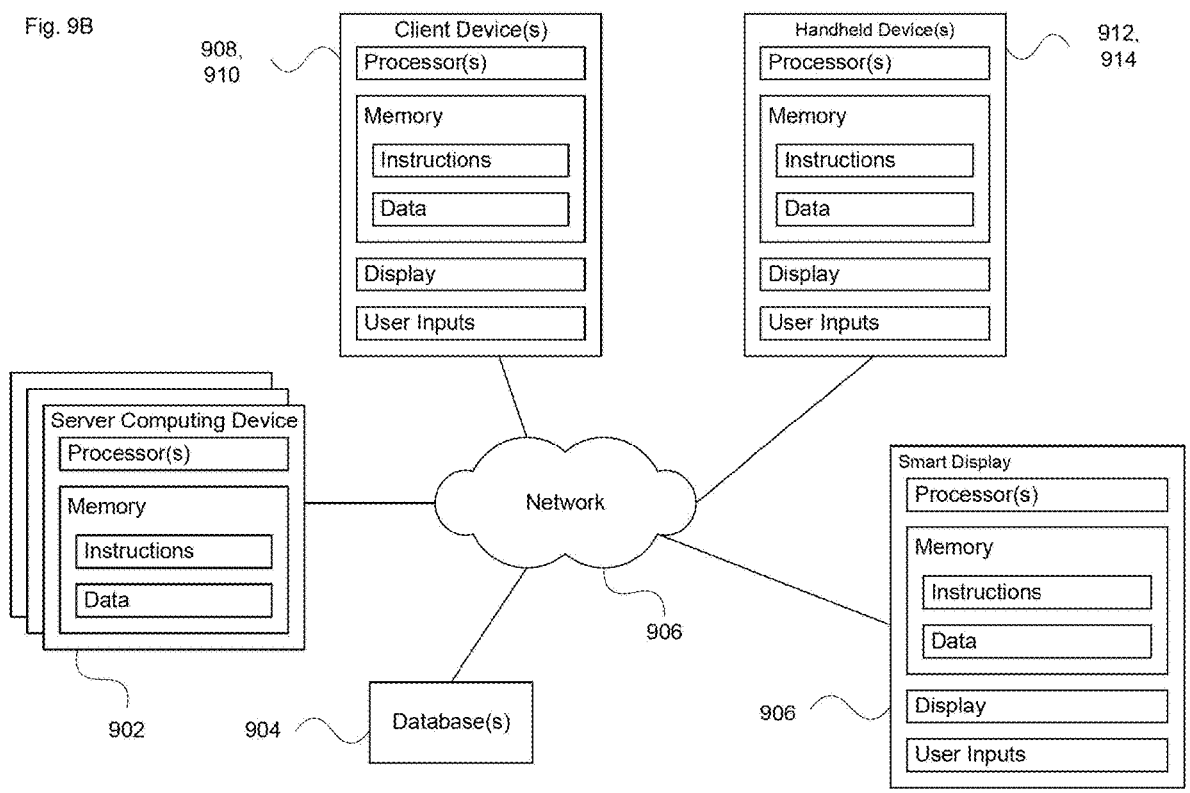

Fig. 10B

1012 — Wherein the diagnostics option(s) includes a connectivity metrics option, and upon selection of the connectivity metrics option, the method further includes at least one of: generating real-time network resource information for presentation on the display device via the graphical user interface; or generating resource information associated with resources utilized by the content at the remote service Fig. 10C
1020

1022 — Wherein the diagnostics option(s) further includes a prioritization option for the content, the prioritization option relating to at least one of network bandwidth usage or processor usage by the processing module regarding one or more display parameters 1024 — Wherein upon selection of the prioritization option, the method further includes suspending or deprioritizing one or more services being run on the computing device

1040

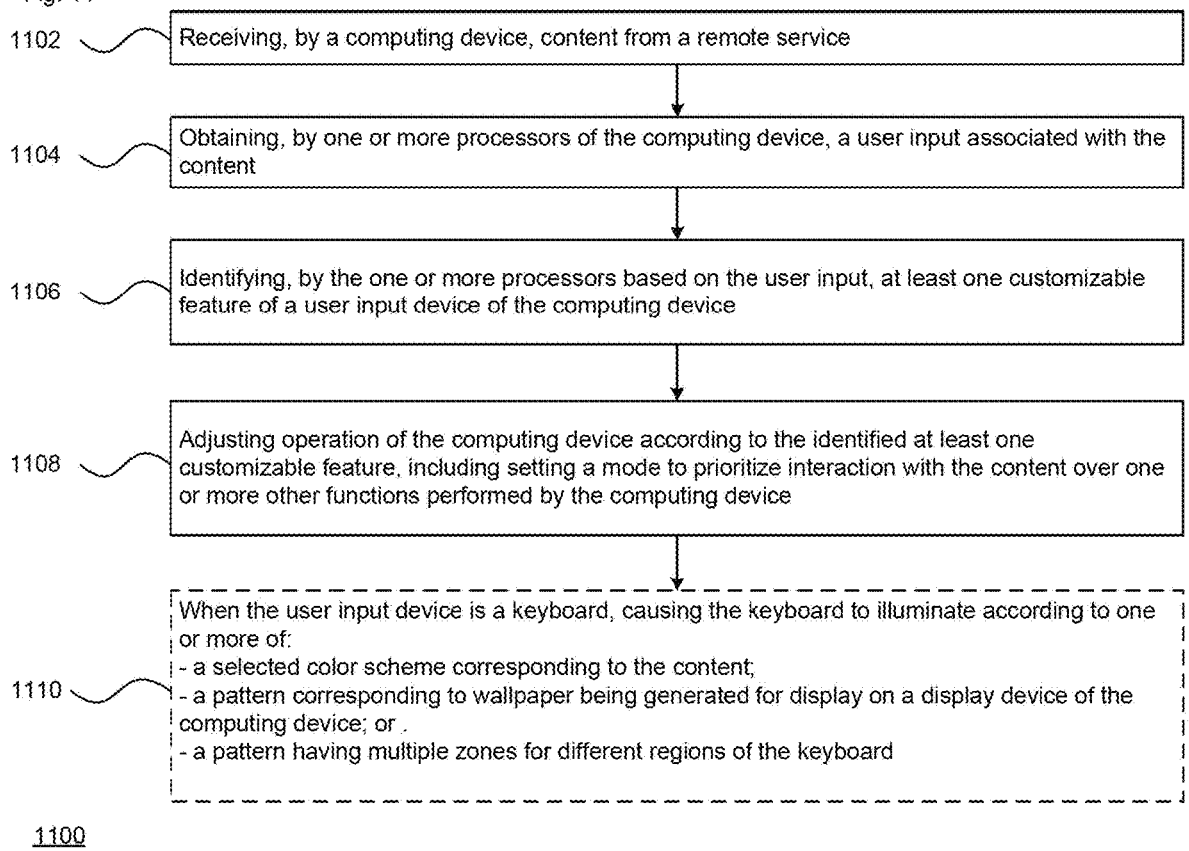

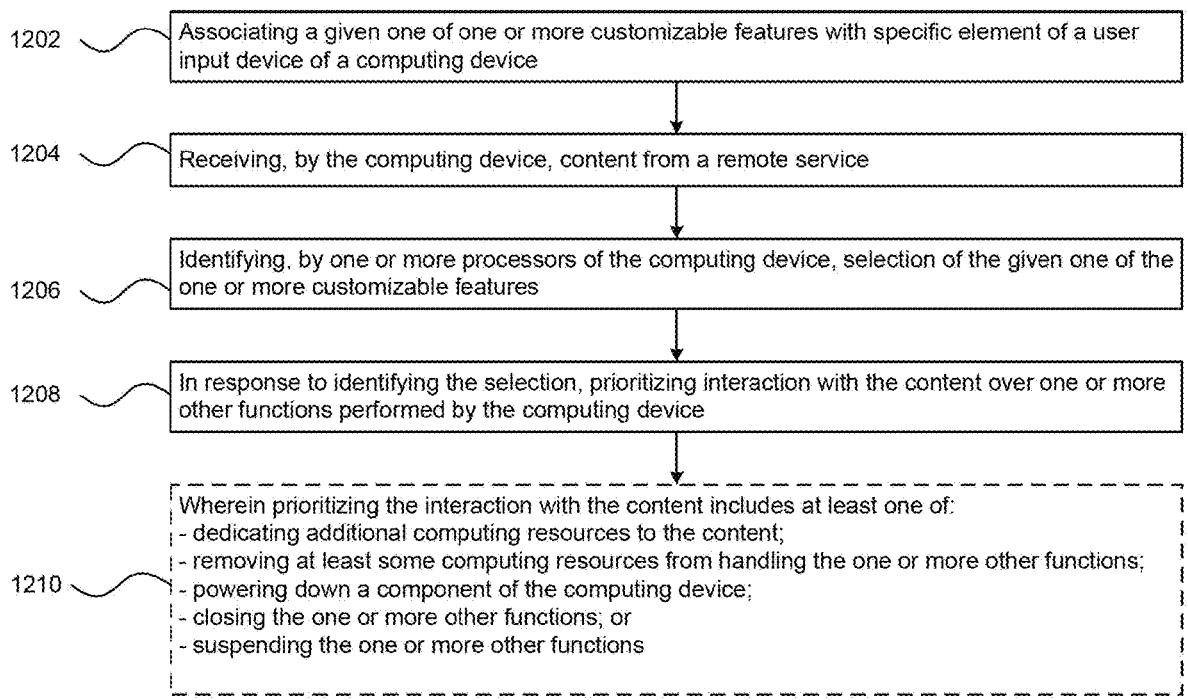

CLOUD GAMING COMPUTING DEVICE

CROSS-REFERENCE TO RELATED APPLICATIONS

This application is related to U.S. application Ser. No. 17/899,867, entitled Computing Device with Customizable Features to Prioritize Content Interaction, filed concurrently herewith.

BACKGROUND

Computer gaming is immensely popular, including both single player and multi-player games. Recently, cloud gaming has become more prevalent. Cloud gaming enables users to play video games that are hosted by a remote server in a data center. Previously, a user would have a copy of the game resident locally, either stored on a hard drive of the user's computing device, or on a CD-ROM or other storage medium. The user's computing device would execute the game's operations and generate graphics for presentation on one or more display devices. With cloud gaming, a user does not need to download and install the game on their personal device. Rather, the game is streamed to an app or browser resident on the user's device from the remote server, which is hosted by a backend service. While the user sees and interacts with the game locally at their device, the game is actually rendered and played on the remote server.

In order to provide a suitable user experience, streaming for games or other services (e.g., movie/video streaming or enterprise operation) needs to maintain a reliable Internet connection. Through this connection, the backend service sends gaming or other information to the user's device. The Internet connection may be, e.g., a wired local area network (LAN) connection, or a wireless LAN connection. However, if such connections do not support sufficient throughput (bitrate) for different aspects of the game or other app, then streaming of the game may be impacted. Also, latency issues involving the connection, the servers or even the user's device can adversely affect game operation and the user's experience. These and other technical issues may be particularly challenging for user devices that are not stand-alone game systems. For instance, a user's laptop or tablet computer may be used for gaming in addition to schoolwork and/or business activities such as spreadsheets and other data processing. Thus, other technical issues can involve hardware limitations, including issues relating to the display device(s) such as resolution and refresh rate.

BRIEF SUMMARY

Aspects of the technology provide a technical solution that enables application streaming from a backend service to a user's computing device. This includes a user device that is configured to support high resolution and high refresh rate cloud gaming (and other apps and services) while minimizing native latency issues on the user device. In addition, an interface is tailored to enable a user to quickly and easily manage diagnostics to optimize network performance. Other technical features include a keyboard architecture that supports new keys (e.g., a gaming mode button) and personalization.

According to one aspect, a computing device is provided that comprises: a communication module configured to communicate with one or more remote services to receive content; a display module configured to send signals to a display device to present graphical information to a user; and a processing module having one or more processors operatively coupled to the communication module and the display module. The processing module is configured to: identify a latency issue associated with the content, where the content is received from a given one of the one or more remote services; determine a set of diagnostic options based on information about the received content and the latency issue, the set of diagnostic options identifying at least one of network information or display information; and generate, for presentation on the display device via a graphical user interface, a notification indicating the latency issue and the set of diagnostic options, wherein the notification includes an option to access the set of diagnostic options in order to address the latency issue.

In an example, the diagnostics options include a connectivity metrics option. Here, upon selection of the connectivity metrics option, the processing module may be further configured to generate real-time network resource information for presentation on the display device via the graphical user interface. Alternatively or additionally, upon selection of the connectivity metrics option, the processing module is further configured to generate resource information associated with resources utilized by the content at the given remote service.

The diagnostics options may further include a prioritization option for the content. Here, the prioritization option for the content may relate to at least one of network bandwidth usage or processor usage by the processing module regarding one or more display parameters. Alternatively or additionally, upon selection of the prioritization option, the processing module is configured to suspend or deprioritize one or more services being run on the computing device. The latency issue may be identified based on a type of the content received from the given remote service. The latency issue may be identified based on a current state of an application associated with the content that is received from the given remote service. The latency issue may be identified based on an operational status of the given remote service. Any or all of these options may be employed.

The computing device may further comprise the display device, wherein the display device is configured to support a primary resolution at a primary refresh rate, and is configured to support at least one of a fallback resolution or a fallback refresh rate. Here, the fallback resolution is a lower resolution than the primary resolution, and wherein the fallback refresh rate is a lower refresh rate than the primary refresh rate. In this example, the processing module may be configured to automatically select the primary refresh rate upon detection that at least a portion of the content is being received from the given remote service. The processing module may be further configured to automatically select the fallback refresh rate upon determination that network bandwidth with the given remote service is not sufficient to stream the content at less than a threshold latency. Alternatively or additionally, the processing module may be configured to adjust between the primary refresh rate and the fallback refresh rate according to a type of the content. Furthermore, the information about the received content may correspond to one of a game state of a streamed game, a delay associated with load balancing at the given remote service, or where data for the received content is being cached by the given remote service.

According to another aspect, a computer-implemented method comprises: receiving, by a computing device, content from a remote service; identifying, by one or more processors of the computing device, a latency issue associated with the content; determining a set of diagnostic options based on information about the content and the latency issue, the set of diagnostic options identifying at least one of network information or display information; and generating, for presentation on a display device via a graphical user interface, a notification indicating the latency issue and the set of diagnostic options, wherein the notification includes an option to access the set of diagnostic options in order to address the latency issue.

In an example, the one or more diagnostics options includes a connectivity metrics option, and upon selection of the connectivity metrics option, the method further includes at least one of: generating real-time network resource information for presentation on the display device via the graphical user interface; or generating resource information associated with resources utilized by the content at the remote service. The one or more diagnostics options may further include a prioritization option for the content, the prioritization option relating to at least one of network bandwidth usage or processor usage by the processing module regarding one or more display parameters. Upon selection of the prioritization option, the method may further include suspending or deprioritizing one or more services being run on the computing device.

In another example, the computing device supports a primary resolution at a primary refresh rate, and supports at least one of a fallback resolution or a fallback refresh rate, the fallback resolution being a lower resolution than the primary resolution, and the fallback refresh rate being a lower refresh rate than the primary refresh rate. Here, the method further includes automatically selecting the primary refresh rate upon detection that at least a portion of the content is being received from the remote service. The method may further comprise automatically selecting the fallback refresh rate upon determination that network bandwidth with the remote service is not sufficient to stream the content at less than a threshold latency. The method may further comprise adjusting between the primary refresh rate and the fallback refresh rate according to a current state of the content.

According to a further aspect, a non-transitory computer-readable recording medium is provided having instructions stored thereon. The instructions, when executed by one or more processors of a computing device, implement a method comprising: receiving content from a remote service; identifying a latency issue associated with the content; determining a set of diagnostic options based on information about the content and the latency issue, the set of diagnostic options identifying at least one of network information or display information; and generating, for presentation on a display device via a graphical user interface, a notification indicating the latency issue and the set of diagnostic options, wherein the notification includes an option to access the set of diagnostic options in order to address the latency issue.

According to yet another aspect, a computing device is provided which comprises: a communication module configured to communicate with one or more remote services to receive content; a display module configured to display the content to a user; a user input device that includes one or more customizable features corresponding to the content received from a given one of the remote services; and a processing module having one or more processors operatively coupled to the communication module, the display module and the user input device. The processing module is configured to: associate a given one of the one or more customizable features with a specific element of the user input device; identify selection of the given one of the one or more customizable features; and in response to the identified selection of the given one of the one or more customizable features, prioritize interaction with the content over one or more other functions performed by the computing device.

In one example, upon identification of the selection of the given customizable feature, the processing module is configured to either dedicate additional computing resources to the content or to remove at least some computing resources from handling the one or more other functions. In another example, upon identification of the selection of the given customizable feature, the processing module is configured to power down a component of the computing device. In a further example, upon identification of the selection of the given customizable feature, the processing module is configured to close the one or more other functions. And in yet another example, upon identification of the selection of the given customizable feature, the processing module is configured to suspend the one or more other functions. Any of these examples may be employed in any combination.

The one or more customizable features may further include an anti-ghosting feature to address unintended key presses. Alternatively or additionally, the one or more customizable features may include an input element to support a one click launch experience to start a cloud-based application from a selected one of the one or more remote services. The user input device may be a keyboard and the specific element of the user input device is a selected key of the keyboard.

In another example, the user input device is a keyboard, and the keyboard is configured to illuminate with a selected color scheme corresponding to the content. Here, the keyboard may be configured to illuminate in a pattern corresponding to wallpaper being generated for display on the display module. Alternatively or additionally, the keyboard may be configured to illuminate in a pattern having multiple zones for different regions of the keyboard.

According to another aspect, a method comprises: associating a given one of one or more customizable features with specific element of a user input device of a computing device; receiving, by the computing device, content from a remote service; identifying, by one or more processors of the computing device, selection of the given one of the one or more customizable features; and in response to identifying the selection, prioritizing interaction with the content over one or more other functions performed by the computing device. Prioritizing the interaction with the content may include dedicating additional computing resources to the content. Prioritizing the interaction with the content may include removing at least some computing resources from handling the one or more other functions. Prioritizing the interaction with the content may include powering down a component of the computing device. Prioritizing the interaction with the content may include closing the one or more other functions. Prioritizing the interaction with the content may include suspending the one or more other functions. Any of these prioritizing options may be employed in any combination.

When the user input device is a keyboard, the method may further include causing the keyboard to illuminate according to a selected color scheme corresponding to the content. Alternatively or additionally, when the user input device is a keyboard the method may further include causing the keyboard to illuminate according to a pattern corresponding to wallpaper being generated for display on a display device of the computing device. Alternatively or additionally, when the user input device is a keyboard the method may further include causing the keyboard to illuminate according to a pattern having multiple zones for different regions of the keyboard.

According to yet another aspect, a non-transitory computer-readable recording medium is provided having instructions stored thereon. The instructions, when executed by one or more processors of a computing device, implement a method comprising: associating a given one of one or more customizable features with specific element of a user input device of a computing device; receiving, by the computing device, content from a remote service; identifying selection of the given one of the one or more customizable features; and in response to identifying the selection of the given one of the one or more customizable features, prioritizing interaction with the content over one or more other functions performed by the computing device.

All examples described in this section may be combined with any other recited example.

BRIEF DESCRIPTION OF THE DRAWINGS

FIG. 7 illustrates an example streaming scenario in accordance with aspects of the technology.

FIGS. 9A-B illustrate an example network in accordance with aspects of the technology.

FIGS. 10A-D illustrate an example method and variations thereof in accordance with aspects of the technology.

FIG. 11 illustrates another example method and a variation thereof in accordance with aspects of the technology.

FIG. 12 illustrates yet another example method and a variation thereof in accordance with aspects of the technology.

DETAILED DESCRIPTION

The technology provides a computing device for a user that enables application streaming from a backend service. The device supports high resolution and high refresh rate display operation, which is particularly beneficial for cloud gaming as well as other streamed apps and services such as media streaming and enterprise web portals. The computing architecture is configured to minimize native latency issues on the user's device, so that the user does not perceive delays with streamed apps. A graphical user interface (GUI) enables the user to effectively manage network diagnostics to optimize system performance, whether the device uses a wireless or wired communication link. A keyboard arrangement may be employed that supports new keys and personalization via selective lighting, which can provide event-based color control. This can be done when the system detects certain user interactions via the user interface.

Example System

Unless otherwise stated, the disclosed examples, embodiments and scenarios are not mutually exclusive, but may be implemented in various combinations to achieve unique benefits. As these and other variations and combinations of the features discussed above can be utilized without departing from the subject matter defined by the claims, the description of the implementations should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

Example Computing Devices

Figure 1:
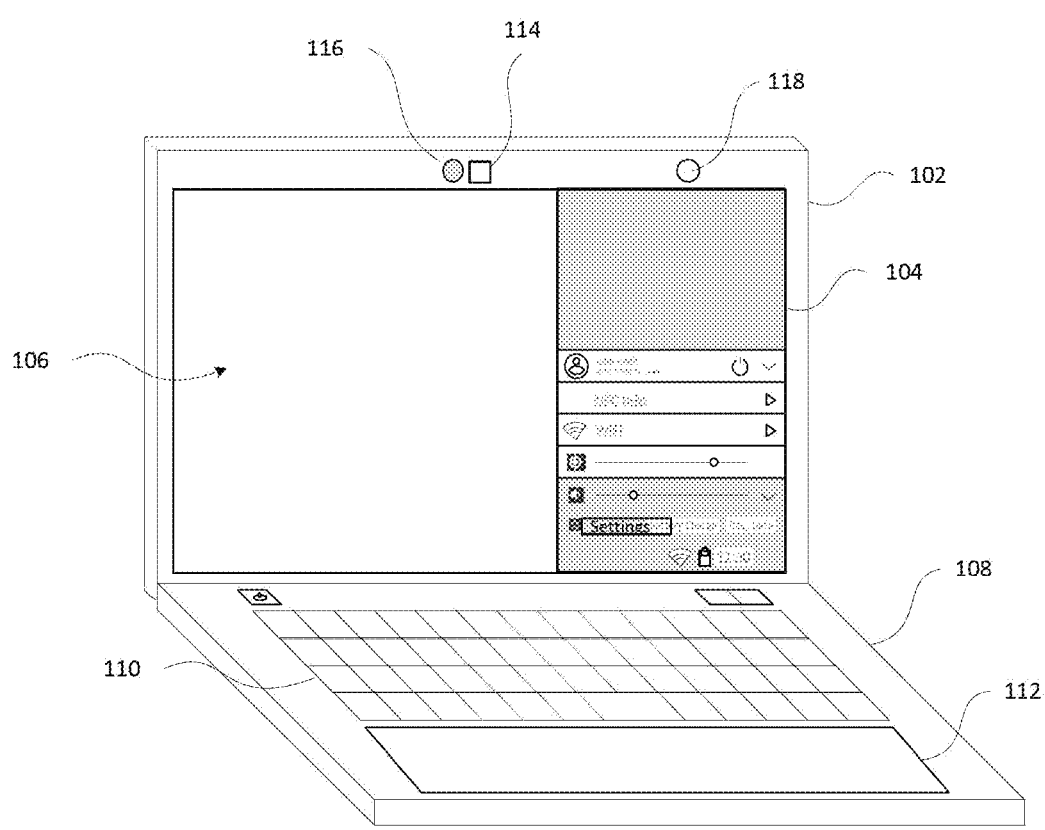
FIG. 1 illustrates a computing device in accordance with aspects of the technology.

FIG. 1 illustrates view 100 showing an example client computing device 102, such as a laptop computer. In this example, there is a display 104 for visually presenting content via GUI 106, and a user input section 108 having a keyboard 110 and a trackpad 112 as different user inputs. A microphone (not shown) may be provided for audible input. The display 104 may be configured as a user input (e.g., a touchscreen). The keyboard 110 may be a virtual keyboard, for instance as part of another display. While one trackpad 112 is shown, the device may have two or more trackpads arranged thereon. The device may contain additional user inputs (e.g., a mouse, audio and/or gesture-based inputs).

The display 104 is configured to support resolutions of at least quad high definition (QHD) resolution of 2560×1440 pixels. For instance, the display 104 may support ultra high definition (UHD) resolution of 3840×2160 pixels (also referred to as 4k resolution), 5k resolution of 5120×2880 pixels, or different resolutions that may be higher. The refresh rate supported by the display 104 may be a minimum of 60 Hz, with refresh rates of 120 Hz or higher also possible. As discussed further below, display latency and other native latencies of the computing device should be as low as possible. Also, while the computing device 102 may include a built-in display, it may be configured to connect (wired or wirelessly) to one or more other displays (e.g., monitors or smart displays)

The keyboard 110 may include various features such as anti-ghosting or other function keys, as well as selective backlighting using, e.g., one or more sets of LEDs. For instance, the keyboard may have multiple distinct zones that are adaptive to a screensaver. Aspects of the keyboard are discussed further below.

An integrated webcam 114 can be used for videoconferences, interactive gaming, etc. Indicator 116, such as an LED, may be illuminated to alert a user whenever the integrated webcam is in use. The client device may also include one or more other sensors 118, which may be used to supplement visual information obtained by the webcam 114. By way of example, the one or more other sensors may include an additional imaging device, an RF- or ultrasonic-based motion sensor, such as to help identify gestures by the user or act as a human presence detector. The integrated webcam 114 may comprise two (or more) imaging devices, which can enable advanced head or body tracking, such as via a human presence sensor module (not shown).

Figure 2:
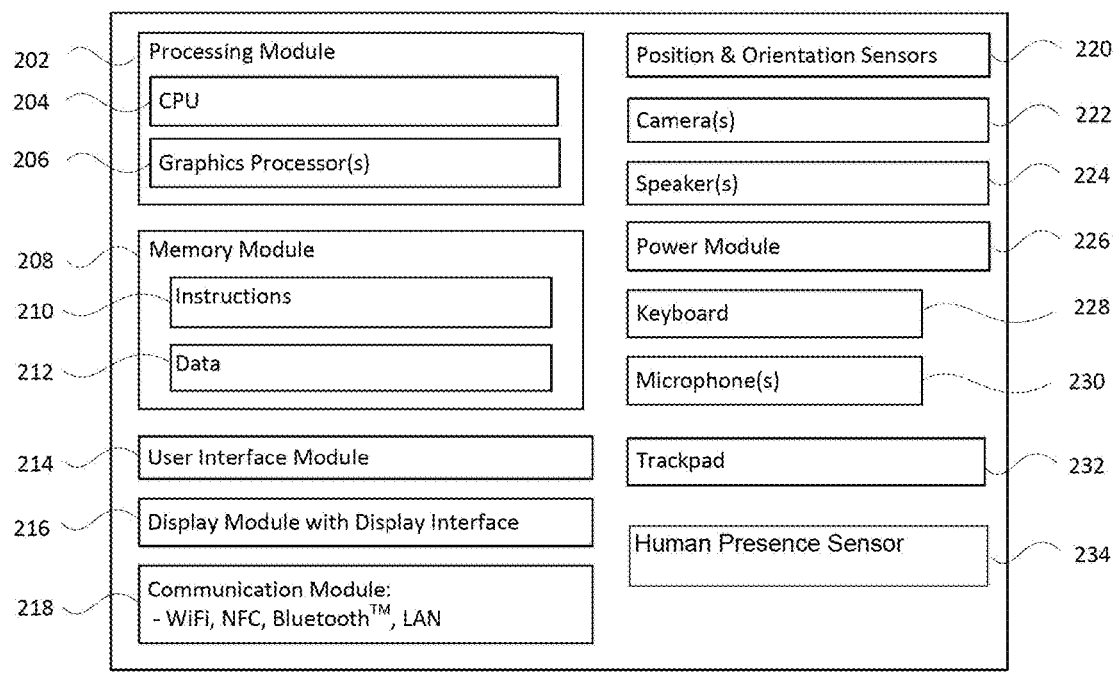
FIG. 2 is a block diagram of the computing device of FIG. 1 in accordance with aspects of the technology.

FIG. 2 illustrates a block diagram of an example client computing device 200, such as the laptop shown in FIG. 1 (e.g., a tablet PC or netbook) or a desktop PC. As shown, the client computing device 200 includes a processing module 202 having one or more computer processors such as a central processing unit 204 and/or graphics processors 206, as well as memory module 208 configured to store instructions 210 and data 212. The processors mayor may not operate in parallel, and may include graphics processing units (GPUs), tensor processing units (TPUs), ASICs, controllers, and other types of hardware-based circuitry. The processors are configured to receive information from a user through user interface module 214 and information from remote devices via communication module 218, and to present information to the user on one or more display devices of display module 216 having a display interface. The display module is configured to send signals to the one or more display devices to present graphical information of the content to a user. The communication module is configured to communicate with one or more remote services to receive content (such as streamed content). The processing module having one or more processors is operatively coupled to the communication module and the display module.

User interface module 214 may receive commands or other input information from a user via user inputs and convert them for submission to a given processor. The user interface module may link to a web browser and other applications executed by the computing device's processing module 202. The user inputs may include one or more of a touchscreen, keyboard or keypad, trackpad, stylus, microphone, or other types of input devices (e.g., a gesture-based input). The display module 216 may include a display engine, and may comprise appropriate circuitry for driving the display device to present graphical and other information to the user, such as at a particular resolution and refresh rate. By way of example, the graphical information may be generated by the graphics processor(s) 206, while CPU 204 manages overall operation of the client device 200. The graphical information may display responses to user queries or other content on the display module 216. For instance, the processing module may run a browser application, messaging application, gaming application, enterprise application or other service using instructions and data stored in memory module 208, and present information associated with the corresponding application or other service to the user via the display module 216. The memory module may include a database or other storage for application-related information, etc.

Memory module 208 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively or additionally, the memory module 208 may also include removable media (e.g., DVD, CD-ROM or USB thumb drive). One or more regions of the memory module 208 may be write-capable while other regions may comprise read-only (or otherwise write-protected) memories. In one implementation, a computer program product is tangibly embodied in an information carrier. Although FIG. 2 functionally illustrates the processor(s), memory module, and other elements of client computing device 200 as being within the same overall block, such components may or may not be stored within the same physical housing. For example, some or all of the instructions and data may be stored on an information carrier that is a removable storage medium (e.g., optical drive, high-density tape drive or USB drive) and others stored within a read-only computer chip.

The data 212 may be retrieved, stored, or modified by the processors in accordance with the instructions 210. The data 212 may include streamed content received from a remote system (e.g., game data or buffered movie data). For instance, the data may be stored in computing device registers, in a relational database as a table having a plurality of different fields and records, XML documents or flat files. The data may also be formatted in any computing device-readable format.

The instructions 210 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance.

As also shown in FIG. 2, the client device 200 includes the communication module 218 for communicating with other devices and systems, including other client devices, servers and databases. The communication module 218 includes a wireless transceiver; alternatively, the module may alternatively or additionally include a wired transceiver. The client device 200 may communicate with other remote devices via the communication module 218 using various configurations and protocols, including short range communication protocols such as near-field communication (NFC), Bluetooth™, Bluetooth™ Low Energy (BLE) or other ad-hoc networks, the Internet, intranets, virtual private networks, wide area networks, local networks, private networks using communication protocols proprietary to one or more companies, Ethernet, WiFi and HTTP, and combinations of the foregoing. By way of example, the device may employ a web-based real time communication, such as WebRTC, which enables web-based applications to stream audiovisual content and to directly exchange data between browser instances.

The example client device 200 as shown also includes one or more position and orientation sensors 220. The position and orientation sensors 220 are configured to determine the position and orientation of one or more parts of the client computing device 200. For example, these components may include a GPS receiver or other global positioning component to determine the device's latitude, longitude and/or altitude as well as an accelerometer, gyroscope or another direction/speed detection device such as an inertial measurement unit (IMU). The client device 200 may also include one or more camera(s) 222 for capturing still images and recording video streams such as the integrated webcam as discussed above, speaker(s) 224. Power module 226 provides power to the various system components. In addition, user inputs include a keyboard 228 and a microphone 230, which may comprise a microphone array having one or more transducers or other microphone elements distributed at various points along the housing of the computing device. Trackpad 232 may include either a capacitive touch sensor unit 234*a* or a piezoelectric sensor unit 234*b* (or both). A human presence sensor module 234 may also be provided. This module may use imagery from the camera(s) 222, audio information from the speakers 224 and/or other sensor information to determine whether a person is in front of the computing device within some threshold distance (e.g., sitting or standing within 3-10 feet of the device).

Figure 3:
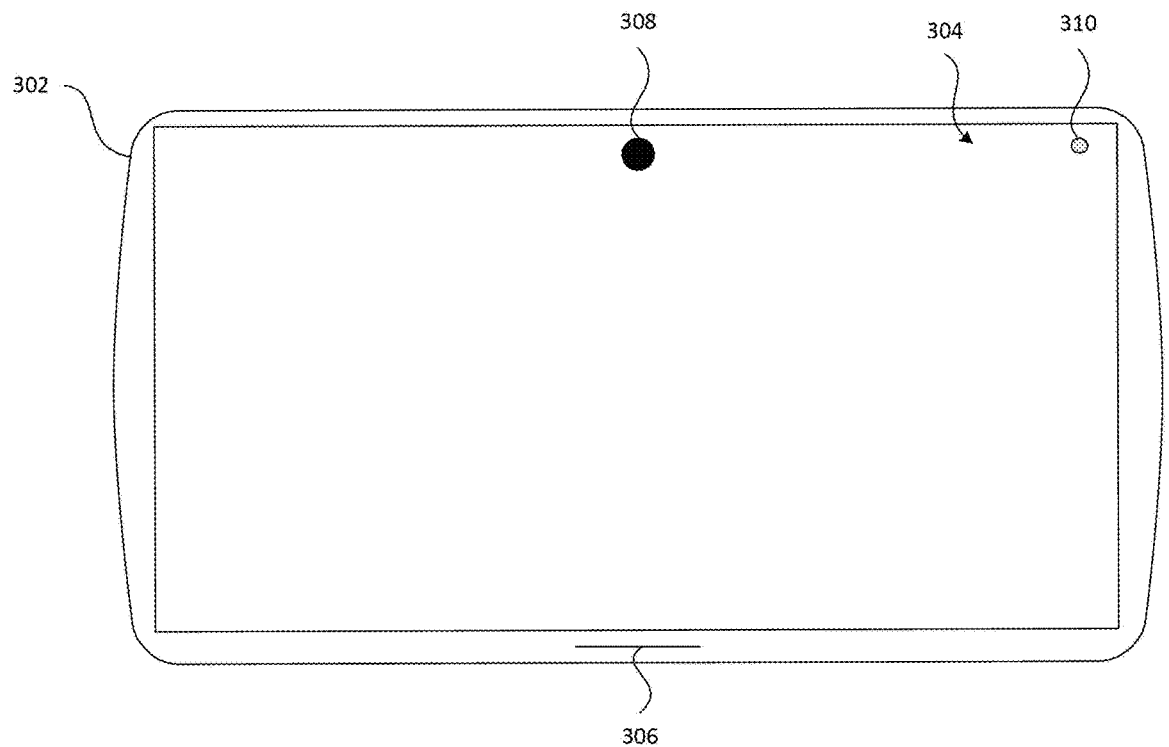
FIG. 3 illustrates another computing device in accordance with aspects of the technology.

FIG. 3 illustrates a view 300 showing an example hand-held-type client device 302, such as a smartphone, personal digital assistant (PDA) or wearable (e.g., a smartwatch). In this example, there is a display 304 for visually presenting content. The display 304 may also be configured as a user input (e.g., a touchscreen), and may have the same type of resolution and refresh rate described above. A microphone 306 may be provided for audible input. A camera 308 can be used for capturing photos, videoconferences, interactive gaming, etc. The camera 308 may be integrated as part of the display module, or may be disposed along a bezel around the perimeter of the display. Indicator 310, such as an LED, may be illuminated to alert a user when the camera 308 is in use.

Figure 4:
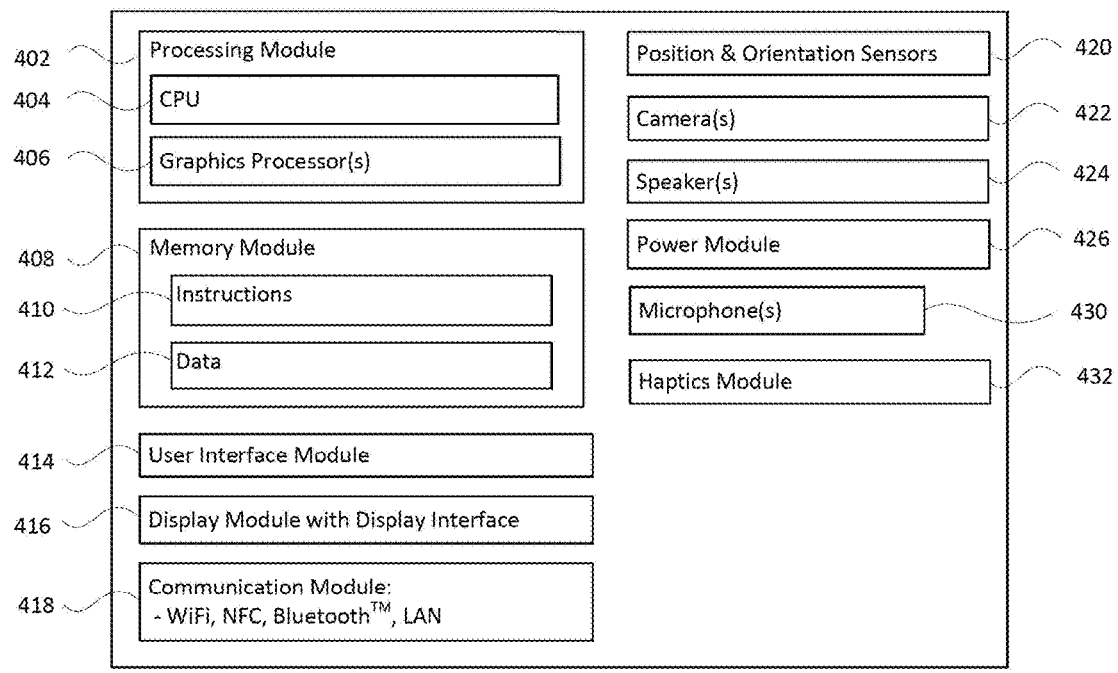
FIG. 4 is a block diagram of the computing device of FIG. 3 in accordance with aspects of the technology.

FIG. 4 illustrates a block diagram of an example handheld client portable device 400, such as the smartphone shown in FIG. 3. Similar to the configuration described above with regard to FIG. 2, the client device 400 includes a processing module 402 having one or more processors such as a central processing unit 404 and/or graphics processors 406, as well as memory module 408 configured to store instructions 410 and data 412. The processors are configured to receive user input from a user through user interface module 414, and to present information to the user on one or more display devices of the display module 416 having a display interface. In this kind of portable client device, there may be no keyboard, or a virtual keyboard (and/or virtual mousepad) may be presented on the display.

User interface module 414 may receive commands or other input information from a user via user inputs and convert them for submission to a given processor. The user interface module may link to a web browser and other applications executed by the device's processing module 402. The user inputs may include one or more of a touchscreen, stylus, microphone, spoken, gesture or other types of input devices. The display module 416 may comprise appropriate circuitry for driving the display device to present graphical and other information to the user at a selected resolution and refresh rate. By way of example, the graphical information may be generated by the graphics processor(s) 406, while CPU 404 manages overall operation of the client mobile device 400. The graphical information may display responses to user queries on the display module 416.

As with memory module 208, memory module 408 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. One or more regions of the memory module 408 may be write-capable while other regions may comprise read-only (or otherwise write-protected) memories.

As also shown in FIG. 4, the client device 400 includes a communication module 418 for communicating with other devices and systems, including other client devices, servers, and databases. The communication module 418 includes a wireless transceiver. The client device 400 may communicate with other remote devices via the communication module 418 using various configurations and protocols, including short range communication protocols such as near-field communication (NFC), Bluetooth™, Bluetooth™ Low Energy (BLE) or other ad-hoc networks, the Internet, intranets, virtual private networks, wide area networks, local networks, private networks using communication protocols proprietary to one or more companies, WiFi and HTTP, and combinations of the foregoing. As noted above with regard to FIG. 2, device 400 may employ WebRTC (or another type of web-based real time communication).

The example client device 400 as shown also includes one or more position and orientation sensors 420. The position and orientation sensors 420 are configured to determine the position and orientation of one or more parts of the client mobile device 400. For example, these components may include a GPS receiver or other global positioning component to determine the device's latitude, longitude and/or altitude as well as an accelerometer, gyroscope or another direction/speed detection device such as an inertial measurement unit (IMU). The mobile device 400 may also include one or more camera(s) 422 for capturing still images and recording video streams such as the integrated camera as discussed above, speaker(s) 424. Power module 426 provides power to the various system components. In addition, user inputs may include a microphone 430, which may comprise a microphone array having one or more transducers or other microphone elements distributed at various points along the housing of the computing device. A haptics module 432 may be used to give haptic feedback to the user. The haptic feedback may be associated with one or more parts of the device housing and/or may be integrated with a touchscreen.

Figure 5:
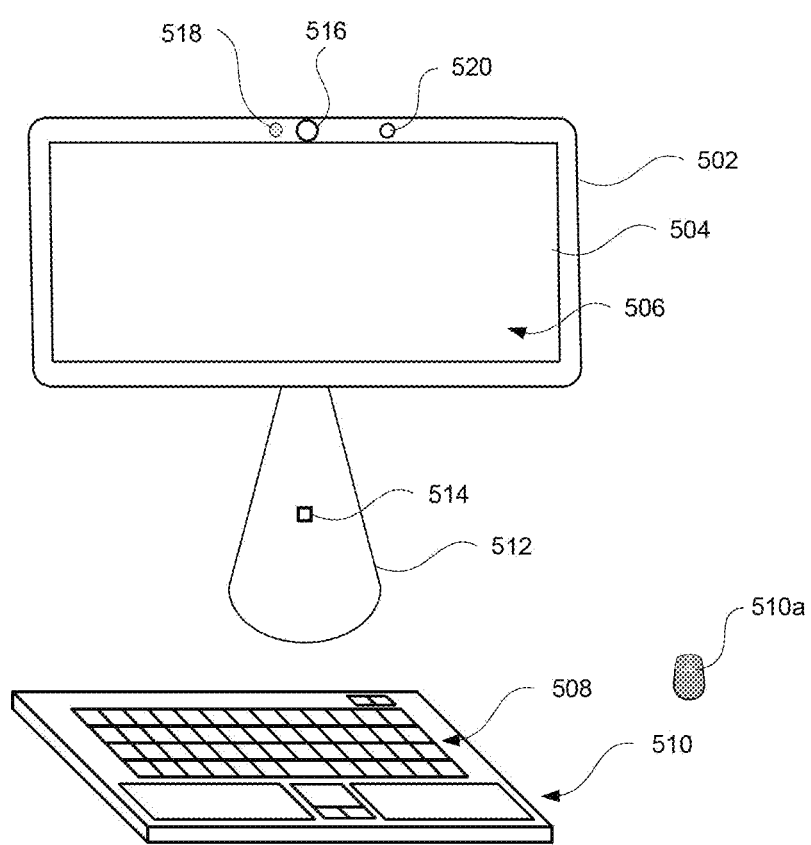
FIG. 5 illustrates a further example computing device in accordance with aspects of the technology.

View 500 of FIG. 5 illustrates yet another example computing device, which can be a desktop-type household computing device 502, or other in-home device such as a smart display. In this example, display 504 may have an aspect ratio such as 16:9, 4:3 or a different ratio, and a resolution and refresh rate of any of the examples described above. The display may have a diagonal size of, e.g., 19 inches, 21 inches, 24 inches or more or less. The display may present a GUI 506, and be configured for tactile input using a stylus or touch input with the user's finger(s). As shown, the computing device may employ a wireless keyboard 508 and/or one or more trackpads or mousepads 510, which may be part of one unit or the keyboard may be separate from the trackpad/mousepad or a mouse-based input 510a. The computing device 502 has a stand 512. One or more microphones 514 may be disposed along the stand and/or disposed along the housing of the computing device 502. While the computing device may be fixedly mounted to the stand 512, in an alternative configuration the screen (with the integrated components) can be detached from the stand, allowing a user to carry around the home and use remotely based on battery power, such as a smart display. In other words, the computing device 502 can comprise an integrated housing that is (optionally removably or releasably) coupled to the stand 512.

A webcam or other integrated camera 516 that may include a privacy shutter or other feature to disable image-taking is positioned along the housing of the computing device 502, which can be used for videoconferences, interactive gaming, etc. Indicator 518, such as an LED, may be illuminated to alert a user whenever the webcam 516 is in use. The device may include a separate camera or other imaging device 520 that is part of a human presence sensor module. As shown, the webcam 516 and the imaging device 520 may each be positioned along a top bezel of the integrated client device housing. In some examples these devices may be located in different position along the integrated housing. The integrated camera 516 may be used as part of the presence sensor module instead of or in addition to imaging device 520. In other words, the presence sensor comprises an image sensor configured to take one or more images. The presence sensor can be configured to detect presence of one or more people within a threshold distance from the client computing device. These and other components of the computing device may be equivalent to those described above with regard to FIG. 2.

Example Configurations
Networking Enhancements Interface

Networking issues, including latency, may adversely affect the ability of a computing device to stream or otherwise obtain latency-sensitive content. Latency can cause disruptions with real-time use, such as cloud-based gaming, video streaming etc. Network latency can be compounded by internal delays or other issues (e.g., display refresh rate) at the computing device. Thus, one aspect of the technology provides a set of new tools that allows the user to understand when their network capabilities are unideal, but can also make adjustments to optimize bandwidth for cloud gaming or other apps. This can include presenting an interface to inform the user what to do in an actionable way to help them adjust network parameters, without information overload or detailed diagnostics. For instance, the system may initially generate a notification to indicate that interaction with received content is being (or will be) impacted by an identified latency issue associated with the received content. For a cloud gaming scenario, the interaction could be both receiving parts of the content from a cloud gaming service but also user actions in the game that are sent to the cloud gaming service. For a video streaming scenario, the interaction may be receiving or buffering the streamed content. The notification may include an option to access a setting or settings that correspond to receiving the content or displaying at least a portion of the content. The system may identify a set of diagnostic options based on information about the content (e.g., is the currently received portion of the content a cut scene or part of game play associated with a particular game state) and/or the latency issue (e.g., whether there is a delay due to how the service is performing load balancing or where content is being cached). The notification can indicate the latency issue and the set of diagnostic options, and can include an option to access the set of diagnostic options. Based on the identification (of the set of diagnostic options), the system can select a subset of diagnostic options associated with the latency issue that may be presented to the user upon selection of the option to access the setting(s), e.g. upon selection of the presented notification. One diagnostics option may be a connectivity metrics option that can be used to show the user real-time network resource information. Selection of the connectivity metrics option can cause the system to generate resource information associated with resources utilized by the content at the given remote service. Another option may be an option to prioritize the content over other apps, services or resources of the computing device. A prioritization option can relate to controlling or adjusting at least one of network bandwidth usage or processor usage. For example, a prioritization option may include suspending or deprioritizing one or more other services/functions being run on the computing device (i.e. services, or functions, other than receiving the content). Deprioritizing one or more services/functions can include removing at least some computing resources from handling the one or more other services (or functions); in other words, computing resources can be reallocated to handle the content being received from the remote service.

Figure 6A:
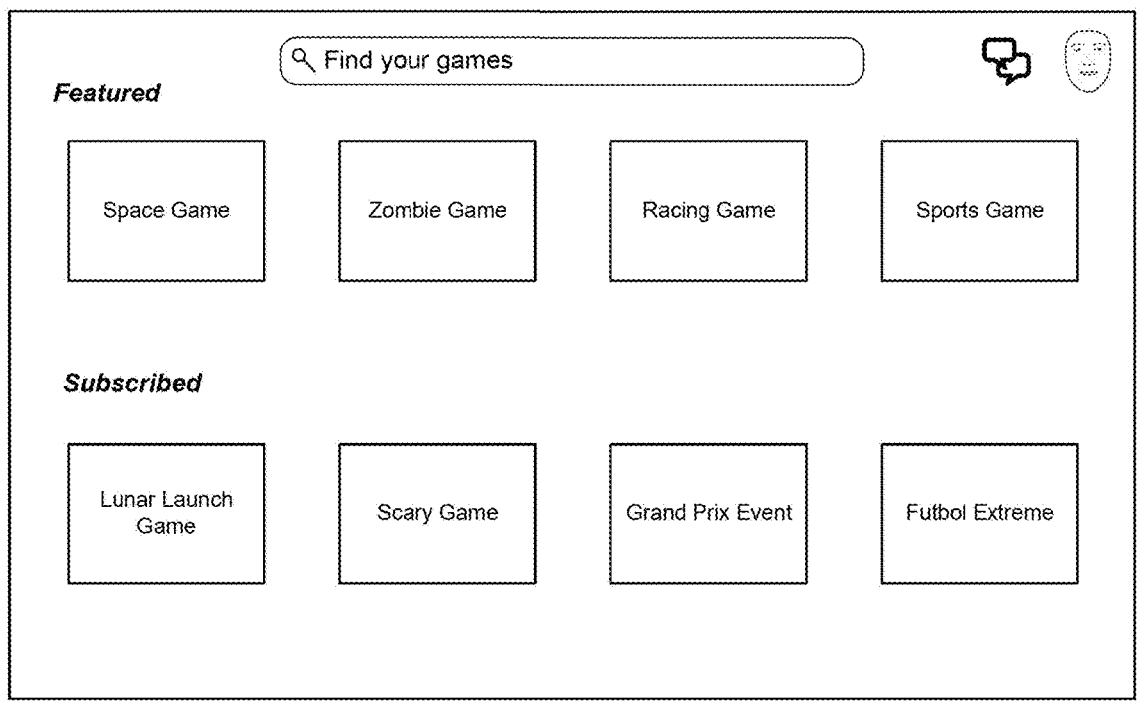
FIGS. 6A-C illustrate an example network performance interface in accordance with aspects of the technology.

FIG. 6A illustrates a first view 600 of a GUI on the user's display screen. Here, the GUI lists various games hosted by a cloud gaming service. For instance, the service may promote one or more featured games that users can play, as well as any subscribed games for which the user has a subscription. Selecting any of the listed games in the GUI would initiate gaming where the service streams the game to an app or browser resident on the user's device from a remote server, for presentation on the display(s) of the user's device.

Figure 6B:
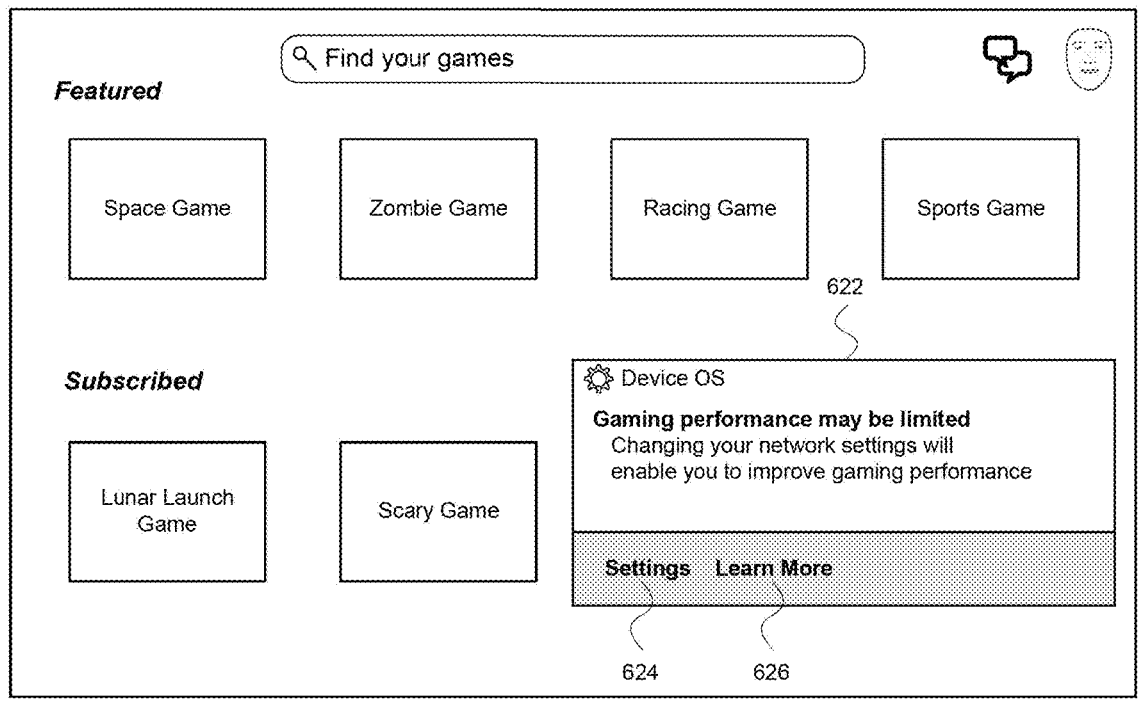

FIG. 6B illustrates a second view 620 of the GUI on the display screen. Here, when a web browser or other access point to the gaming service is connected, the processing system of the user's device may detect that there are one or more issues that could adversely affect game play as experienced by the user. In this case, a popup or other notification 622 may be presented in the GUI to advise the user that gaming performance may be limited. Here, the notification 622 may have a setting link 624 and/or an option to learn more 626. This is in contrast to presenting a detailed screen showing current or recent network throughput or other technical information about the network connection. Rather, the notification 622 provides a simple and intuitive experience to debug network bottlenecks that may adversely affect the gaming experience. Latency issues may therefore be resolved or addressed more quickly by a user. According to one aspect, game latency (or latency associated with the streamed content) can inform the system about performance bottlenecks. The system may identify that there is a current latency issue (e.g., occurring over the last X seconds), and associates that latency with the content being streamed to the computing device. In other words, the system can identify a latency issue associated with the content, where the content is received from a given one of the one or more remote services, and determine a set of diagnostic options based on information about the content and the latency issue, the set of diagnostic options identifying at least one of network information or display information. The system can then generate, for presentation on the display device via a graphical user interface, a notification 622 indicating the latency issue and the set of diagnostic options, wherein the notification includes an option (such as setting link 624) to access the set of diagnostics in order to address the latency issue. Generally, cursor movement may not be enough, as it requires rapid paced in game action. Thus, the notification 622 may only be surfaced when the user is playing a game (or interacting with other streamed content, such as making an active selection) and is currently experiencing a poor experience. For example, a user may experience a poor streaming experience when latency exceeds, or is more than, a latency threshold. Alternatively, the system may determine that there is no current latency, but predicts that there will be a latency issue (e.g., over the upcoming Y seconds) that may exceed a latency threshold. In this way, the notification 622 would be helpful to the user in the moment to mitigate or avoid a latency issue.

Figure 6C:
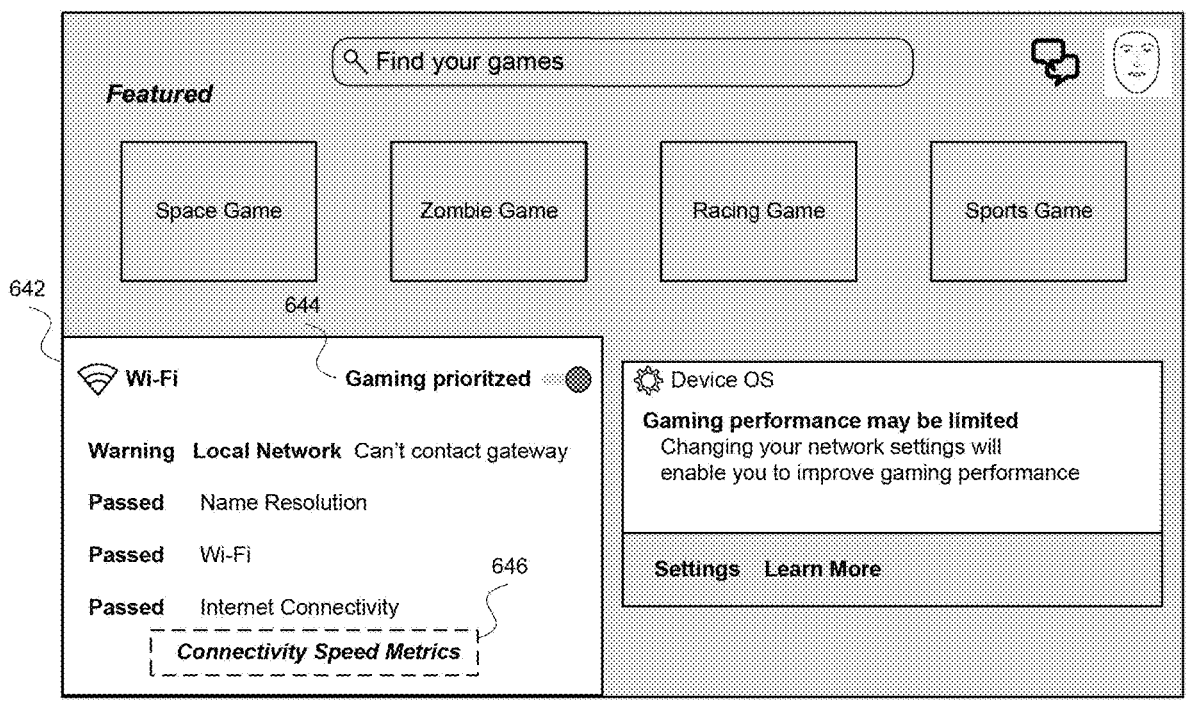

As shown in view 640 of FIG. 6C, selecting a "learn more" option 626 may link to the gaming service's site or other website that explains more about network issues or relevant bottlenecks, while selecting the setting link opens a settings/diagnostics panel or other modified display element 642. By way of example, the modified display element may be a panel that is added to or overlays a portion of the graphical user interface. The panel may be presented as a popup window or part of a notification element in a system tray. Other presentation options may also be employed. Here, basic information about network features (e.g., gateway, name resolution, Wi-Fi, Internet connectivity, etc.) can be presented for rapid comprehension. This could also include more detailed information about how the backend service performs load balancing or caching, which may be dependent on a tier of service that the user has. A "Gaming prioritized" option 644 can be selected (or de-selected). This can prioritize traffic for the back-end gaming service. This option relates to network bandwidth usage as well as processor usage regarding one or more display parameters (such as e.g. refresh rate or resolution). By way of example, upon selection of this option, other services may be suspended or deprioritized while gaming is prioritized. This can include dedicating more computing resources (e.g., processors, cores, threads and/or buffer memory) to the gaming content versus other apps or services such as browser instances, task or file management, etc. Alternatively or additionally, it could include powering down certain device components or putting certain apps or services in a sleep mode (or simply closing such apps or services). Dynamic control of the network bandwidth and/or computing resources can help to mitigate or avoid latency issues.

A "Connectivity Speed Metrics" indicator 646, when selected, can provide more detailed information if warranted. By way of example, this can include general consumption of network resources at the device, as well as back-end information such as what is being requested by the game, general network status, etc. In one example, a modulation and coding scheme (MCS) table or index can be presented, which provides information about the actual transmission reality between the user's device and a WiFi access point (or other network connection node) at a given point in time). A maximum bitrate may be derived from the current MCS settings of the client's device. In this way, a streamed set of information is first presented to help the user adjust settings for a better gaming experience, without overloading unnecessary details that may not meaningfully help resolve the networking issue(s).

Display Features and Constraints

Whether the computing device is a netbook-type laptop, a tablet or other type of computing device, a high-quality display device (or devices) is particularly beneficial for cloud-based gaming and other apps (e.g., media streaming or an enterprise web portal). Thus, according to one aspect the device may be configured to support resolutions of at least QHD, UHD, or higher. In addition, the refresh rate may be on the order of 120 Hz or higher, where this refresh rate is selected automatically by the system upon detection of the cloud-based gaming or other streaming app, with a fallback of a minimum of 60 Hz if needed. In one example, the system may default to a primary refresh rate, such as a maximum possible refresh rate, as content is initially received. If the system determines that the network bandwidth is not sufficient to stream at the needed latency, such as at or below a threshold latency (e.g., within X ms), then the system can adapt to improve the latency at lower refresh rates (e.g., rates below 120 Hz). Thus, the system may have a fallback refresh rate to be employed based on latency. The system may continuously or regularly monitor network latency and/or on-device latency issues, and adjust the refresh rate accordingly.

While certain apps such as media streams may have continuous bandwidth requirements, other apps such as cloud-based games may have significant variations in their bandwidth. For instance, with regard to video quality, the gameplay requirement may be stronger than cutscene, with certain types of games (e.g., racing games and action sports) having a highest amount of sensitivity as compared to other types of games (e.g., card games or games of chance). FIG. 7 illustrates an example 700 in which computing device 702 is streamed a game 704 by a cloud gaming service 706 via network 708. With such games, the bitrate for a cutscene (which is non-interactive) can be, e.g., as low as 12 Mbps, but gameplay where the user is actively controlling one or more aspects may be higher than 20 Mbps. In this example, a relatively lower bitrate cutscene may include pre-game introduction of the teams, while the gameplay may include the user selecting one or more skills for different players, or play selection for a team. The display engine in the device's processing module, which may be implemented by one or more onboard GPUs, is configured to support such bandwidth needs and can employ enough hardware overlay planes to dedicate high refresh content. The amount of hardware overlay planes refers to windows rendering fast enough or pixels going fast enough on the screen. In addition, according to one aspect the render stack should be able to also adapt and account for faster decoded and rendered frames, so there is no latency introduced in any path of the pixels showing on the screen.

In one scenario, there is logic in the graphics stack configured to control when to enter the high (e.g., primary) refresh rate (e.g., 120 Hz or higher) and when to maintain 60 Hz (or some other fallback refresh rate below, or lower than, the high/primary refresh rate). This logic may evaluate the type of app being streamed, or the state/mode of the app (e.g., whether it is during gameplay or during a cutscene), in order to determine which refresh rate to utilize. In particular, the system can be configured to adjust between the primary refresh rate and the fallback refresh rate according to a type of the content. By way of example, during gameplay a primary refresh rate may be used in order to support a relatively large bandwidth for received content, while during a cut scene a fallback refresh rate may be used to support a relatively lower amount of bandwidth, or vice versa. Or the refresh rate may correspond to a type of service that is providing the content. Thus, an audio streaming service that presents limited information in the GUI may need a lower refresh rate than a video streaming service. In addition, output from video decoder can be directly composited by the display controller on a dedicated hardware overlay. In one scenario, the processing of the frame may be performed on the server side, where it is encoded and sent over the network to the computing device. The processed frame is subsequently decoded on the computing device and rendered on the associated display(s). Dynamic control of the refresh rate of the display device can help to mitigate or avoid latency issues.

In order to reduce native latency, WebRTC or another real-time pipeline is configured to transfer network packets received from the backend cloud system and provide them to the graphics stack of the device's operating system. Additionally, while the resolution and frame rate are constrained by the architecture of the display device, there are service (back end) dependencies associated with this. For instance, streams may be required to be set to only at 60 or 120 Hz, depending on the refresh rate of the display(s). If the network (e.g., 708 in FIG. 7) cannot provide data consistent with that rate, the backend system may need to make adjustments accordingly. The system may determine when there is an experience that requires a high refresh rate based on the frame rate that is being pushed through to the computing device. The system may then surface the option to the user to modify the refresh rate and control it as appropriate. This can be accomplished via API feature that is part of the graphics stack and may also interface with the web apps stack. According to one aspect, latency should be minimal to avoid any lag in gameplay; however, this can vary depending on the particular game. In one scenario, a latency threshold in many instances is 60 ms or less.

Enhanced User Input Device Arrangements

Users can personalize their computing devices in different ways, such as adding decals or skins on the outer housing.

However, in contrast to such static physical overlays, it may be desirable to provide real-time personalization depending on how the user is currently operating their device. It can also be beneficial to augment certain features of the device during operation. According to one aspect of the technology, enhancement or augmentation of the computing experience (e.g., during cloud gaming) is achieved by tying in relevant in-context events to whatever is shown using lighting of the keyboard and/or other user input devices. This may include simple app-based presets to complex real-time in-game event triggers.

Figure 8A:
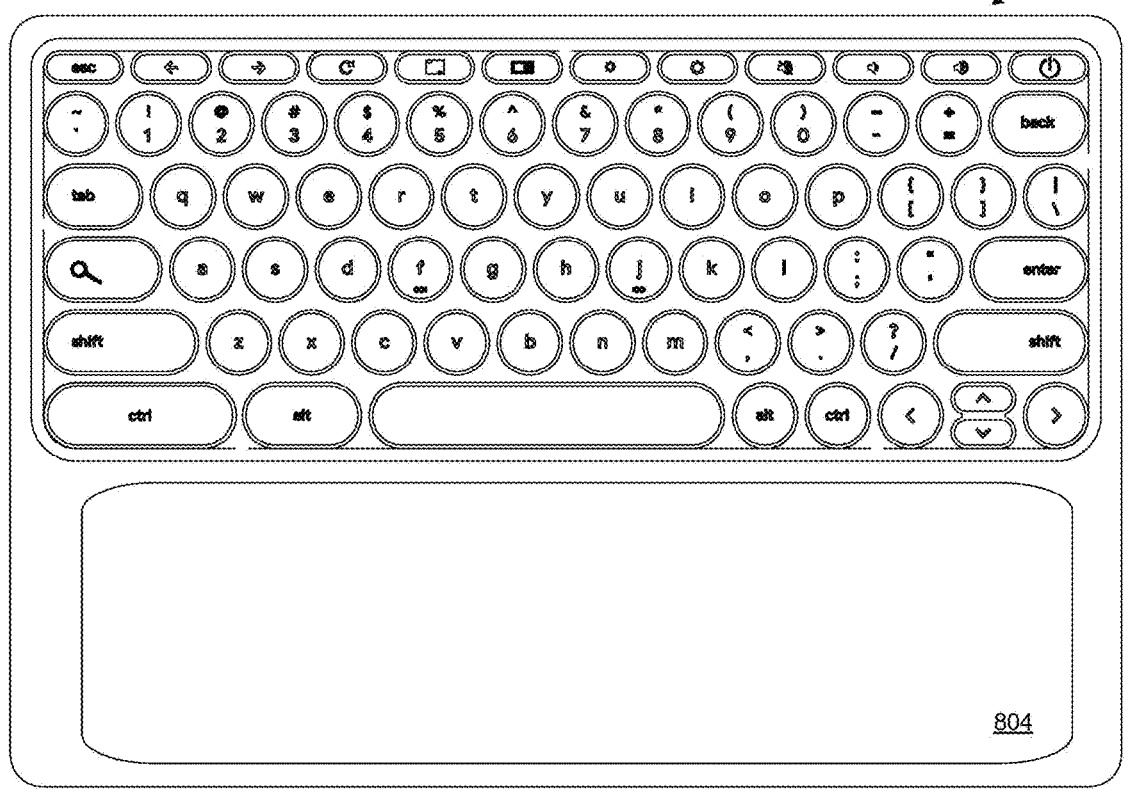
FIGS. 8A-C illustrate keyboard scenarios in accordance with aspects of the technology.

The personalization and/or operational augmentation may be done via illumination of one or more areas of the keyboard or other user input device (e.g., trackpad or mousepad). Here, the keyboard may be a physical keyboard with a set of discrete mechanical keys that can be illuminated. FIG. 8A illustrates a portion 800 of a computing device including a keyboard 802 and a mousepad or other trackpad 804 configuration. In this example, the keyboard 802 includes a set of mechanical keys based on a QWERTY-type layout, with various function keys arranged in a row along the top of the keyboard. The trackpad 804 may provide haptic feedback to the user. In addition or alternatively, the trackpad 804 may be configured to provide a virtual display area that can show icons, softkeys, graphics or other visual information. Here, for instance, the trackpad 804 may generate split zones that can be highlighted (e.g., 2 or more zones).

The keyboard 802 may include various features such as anti-ghosting to deal with unintended key presses, as well as other function keys. For instance, ghosting may occur when one or more keystrokes are not processed, e.g., because the hardware cannot read a particular key combination, the software does not support multiple simultaneous key presses, or the communication protocol limits a maximum number of simultaneous key presses that can be reported. Here, keys that may commonly be associated with gaming or other activities can be remapped (e.g., in association with the keyboard software or in a game setting). Alternatively, each key in the keyboard may be configured for independent switching for very large multiple-key combinations. There may be a gaming mode button as a function key that enables certain software functionality around gaming. By way of example, this can include changes in which wallpaper to present on the GUI, what color(s) to illuminate the keyboard, modifying thermal management or rendering capabilities of the computing device, etc. In addition or alternatively, there may be a customizable button for a one click launch experience to start gaming or activate some other cloud-based app. Such buttons or other keys can include function keys or programmable inputs, which may be used to trigger specific game modes or other situations that prioritize system resources in order to make gaming more effective. By way of example, as noted above, a "Gaming prioritized" option can be selected (or de-selected). While this may be done via selector 644 in a displayed panel, it may also be done via a function key or programmable key on the keyboard or other user input device. When selecting or actuating such a key, the processing system of the computing device can prioritize traffic for the back-end gaming service. In other words, a customizable feature can be associated with a specific element (such as a key) of the user input device and, in response to selection of the given customizable feature, interaction with the content can be prioritized over one or more other functions performed by the computing device. By way of example, upon selection of this option, other services or apps being run on the computing device may be suspended or deprioritized while gaming is prioritized. Such keys can also be used to conserve power, similar to a battery saver-type mode, e.g., in which certain resources of the computing device are turned off or put into a sleep or other low power mode.

In one scenario, the mechanical keyboard supports the human interface devices (HID) protocol. The key report rate may be on the order of 800 Hz to 1000 Hz or higher. The keyboard may support Nth Key rollover, which will enable the user to press any N keys simultaneously and have the system detect each of those key presses. The keyboard 804 may include selective backlighting using, e.g., one or more sets of LEDs. The LEDs may be configured to illuminate individual keys and/or specific regions of the keyboard in different colors. For instance, the keyboard may have multiple distinct zones that are adaptive to change color to conform with a screensaver.

Figure 8B:
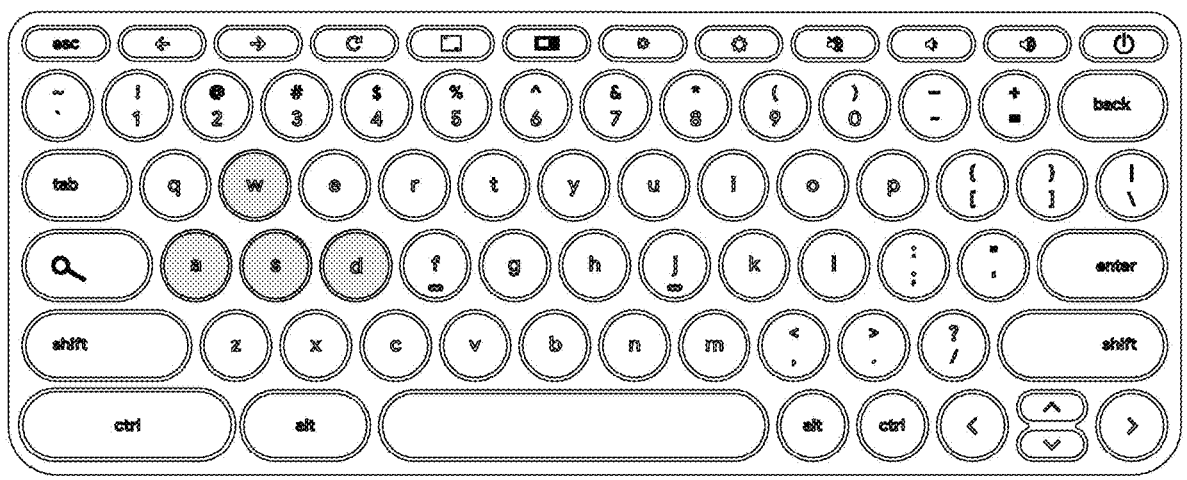

According to one aspect, keyboard illumination may involve event-based color control. By way of example, to make the keyboard reactive to gaming experiences, the keyboard can react a certain way when the user opens a gaming app or title, or uses the browser to go to a cloud gaming website. For instance, the processing system can detect manipulation of the user interface, link to a gaming website, launch an app, and use this detection to cause a specific group of keyboard keys to light up. FIG. 8B illustrates an example 820 in which the WASD keys (or the zone round the WASD keys) is illuminated as indicated by the shading. The WASD keys can be used in place of a separate game controller or arrow keys. For instance, W and S may control forward and backward movement, while A and D may control left and right. And as shown in game example 704 of FIG. 7, these keys may be associated with selected game functionality (e.g., player skill moves in a sports game). By way of example, the processing system may detect whenever a cloud gaming website has been accessed (e.g., via a browser webpage or clicking on an icon) and cause the selected keyboard key(s) to change color to a preset, which may be a default preset from the computing device's operating system, or a user-adjustable preset. As a starting point in one scenario, the system could define most keyboard keys to be illuminated in a neutral color (or not illuminated at all), and the WASD zone to be illuminated in bright red (or another color). Here, the user can have the option to configure this preset.

Figure 8C:
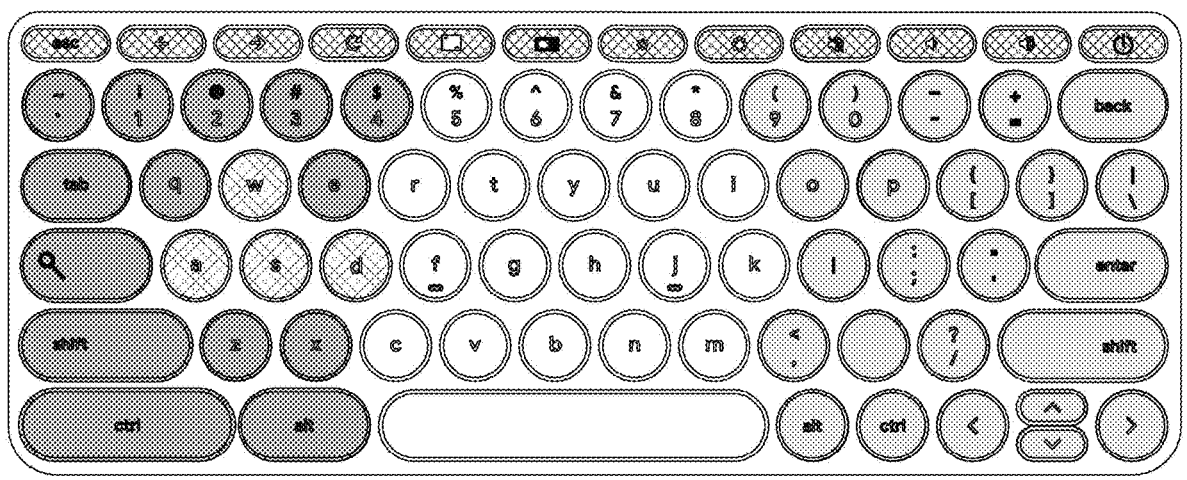

FIG. 8C illustrates another example 840, in which a plurality of zones of the keyboard are illuminated in different colors as shown by the different shading. While this example presents 5 different zones (including the WASD zone), more or fewer zones having different illumination may be provided. And while specific keys are shown for each of the 5 zones in this example, other zone configurations or permutations of lighted keys may be employed.

Additionally or alternatively, when in gaming mode, the system could apply a cheat code Easter egg—e.g., a specific sequence of keys that enables special easter eggs for gaming. For instance, this can include a particular sequence of keys flashing in a selected color(s) to guide a user interaction with the keys, opening up a particular game in a browser window, or opening up a special panel for a keyboard-focused game (e.g., a game involving remembering a flashing color sequence). In another situation, a simple keyboard-based game may have the player guide a character across a side-scrolling landscape, in which the user would maneuver the character to avoid obstacles in order to score points.

Additionally or alternatively, the device's user interface may enable the user to set controls that change with time. In this case, no event-based triggers may be considered. By way of example, the keyboard color pattern may gradually shift between hues and zones cycle through the pattern.

Additionally or alternatively, the system may enable the option to adapt the keyboard color scheme to the wallpaper hue presented on the display, or vice versa. This would entail surfacing some metadata from the wallpaper into the keyboard color controls, and vice versa. In addition, if the user has 'adaptive control' enabled and they are changing the wallpaper, they should be able to see the change in RGB lighting in real-time, as they modify the wallpaper. This wallpaper mapping approach can provide a user experience as though their device is fully designed for them, even when the wallpaper is not visible. Metadata here includes the colors that compose the wallpaper. The color information can be extracted by the system and mapped to the keyboard. In one example, the wallpaper map can be the same regardless of whether any windows are covering some or all of the wallpaper.

Additionally or alternatively, a keyboard level screensaver may be enabled. Here, one or more keyboard zones can be controlled to gradually light up and dim in different hues while the computing device is in standby mode with the lid open (e.g., for a laptop). This could also double as a night light mode.

Additionally or alternatively, the system may take the primary color of whatever is displayed on the screen during game-play and extending this to the keyboard color scheme.

Additionally or alternatively, the keyboard keys may be controlled by the system to light up to indicate the battery is charging or the status of the charging. Here, for example, a sequence of individual keys (e.g., keys along one row of the keyboard or a vertical set of keys) can individually illuminate and/or change color (e.g., from red to yellow to green) to show an amount of charging. In one scenario, the device's user interface may show a battery on the keyboard or the trackpad when the device is first plugged into a power source (or when it is unplugged to indicate battery usage).

There may be a default color setting for the keyboard, as well as one or more color configurations that can be saved so that they are persistent upon rebooting or after user login. In one scenario the user is enabled to control each zone individually. Here, the set colors may or may not be configured to change dynamically. In one scenario, colors can change based on events on the computing device. For example, gaming elements and in-game actions can trigger color changes.

Other System Components

In addition to the above, for portable computing device arrangements such as netbook-type laptops, the device may use a passive thermal approach for cooling, in which fans are not employed. Various connectivity options for the communication module (e.g., 218 in FIG. 2 or 418 in FIG. 4. By way of example, the communication module may support Wi-Fi 6, gigabit Ethernet and/or 5G wireless links. Bluetooth™ 5.2 or higher, which may be integrated or otherwise bundled with Wi-Fi 6, supports Bluetooth LE. For wired connectivity, an Ethernet (RJ45) jack may be included with the device; however, this may not be feasible based on the device's thickness. Thus, instead of the Ethernet jack, a separate dongle may be used (e.g., connected via a USB-C or other connection of the device).

Example Network

Figure 9A:
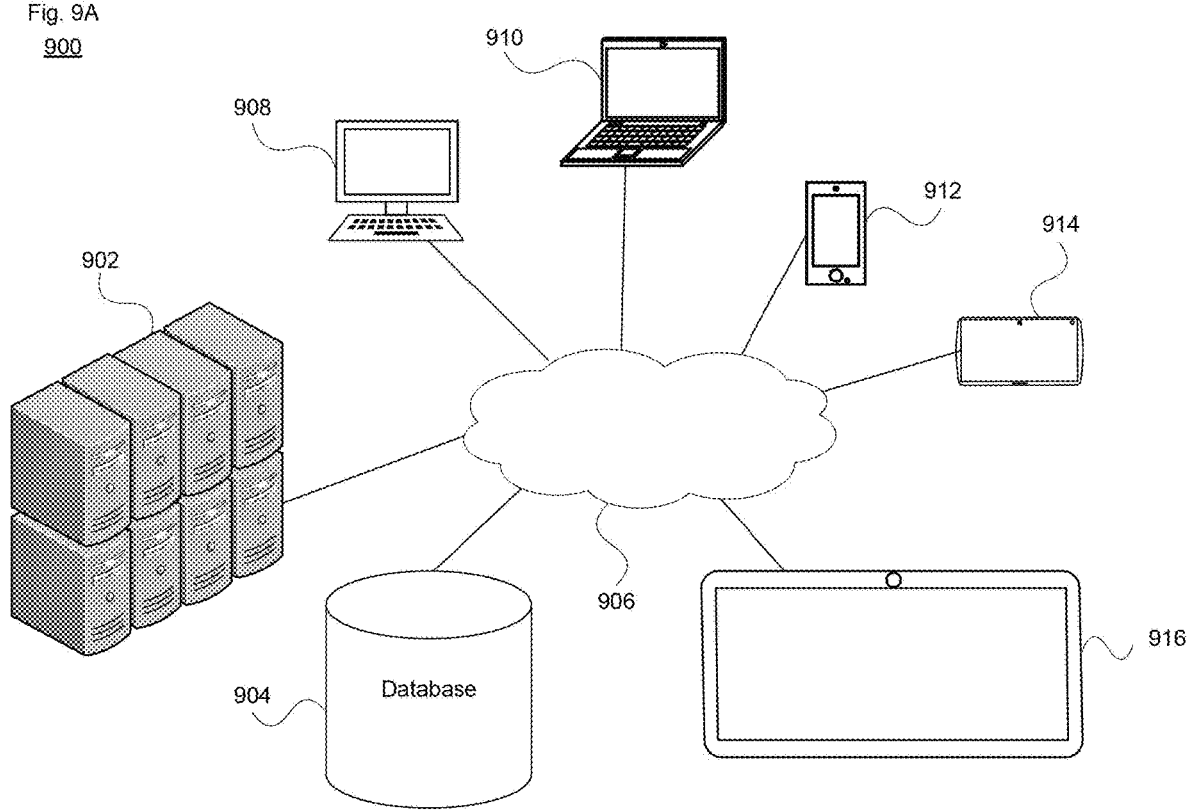

One or more computing devices may connect to one another, e.g., for cloud gaming, shared media streaming or enterprise connectivity, over a network. FIGS. 9A and 9B are pictorial and functional diagrams, respectively, of an example system 900 that includes a plurality of computing devices and databases connected via a network. For instance, computing device(s) 902 may be a cloud-based server system that provides or otherwise supports one or more cloud-based apps, games, or other programs. Database 904 may store messaging app information, game data, user profile information, and/or other information. The server system may access the databases via network 906. Client devices may include one or more of a desktop computer 908 (see example device in FIG. 5) or a laptop or tablet PC 910 (see example device in FIGS. 1-2). Other client devices may include handheld devices including a personal communication device such as a mobile phone or PDA 912 or a tablet 914. Another example client device is a large screen display (e.g., a smart display) 916.

In one example, computing device 902 may include one or more server computing devices having a plurality of computing devices, e.g., a load balanced server farm or cloud computing system, that exchange information with different nodes of a network for the purpose of receiving, processing, and transmitting the data to and from other computing devices. For instance, computing device 902 may include one or more server computing devices that are capable of communicating with any of the computing devices 908-916 via the network 906. This may be done as part of hosting one or more collaborative apps (e.g., a videoconferencing program, an interactive spreadsheet app or a multiplayer game) or services (e.g., a movie streaming service or interactive game show where viewers can provide comments or other feedback).

As shown in FIG. 9B, each of the computing devices 902 and 908-916 may include one or more processors, memory, data and instructions. The memory stores information accessible by the one or more processors, including instructions and data that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing; whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processors may be any conventional processors, such as commercially available CPUs. Alternatively, each processor may be a dedicated device such as an ASIC, graphics processing unit (GPU), tensor processing unit (TPU) or other hardware-based processor. Although FIG. 9B functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of server 902. Accordingly, references to a processor or memory will be understood to include references to a collection of processors or memories that may or may not operate in parallel.

The computing devices may include all of the components normally used in connection with a computing device such as the processor and memory described above as well as a user interface subsystem for receiving input from a user and presenting information to the user (e.g., text, imagery and/or other graphical elements, audibly and/or via haptic feedback). The user interface subsystem may include one or more user inputs (e.g., at least one front (user) facing camera, a mouse, keyboard, touchscreen and/or microphone) and one or more display devices that is operable to display information (e.g., text, imagery and/or other graphical elements). Other output devices, such as speaker(s) may also provide information to users.

The user-related computing devices (e.g., 908-916) may communicate with a back-end computing system (e.g., server 502) via one or more networks, such as network 906. The network 906, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces. In some implementations, the user-related computing devices may also communicate with one another without also communicating with a back-end computing system. This may be done via network 906, or using one or more ad hoc and/or peer to peer communication links directly between the devices.

Figure 10A:
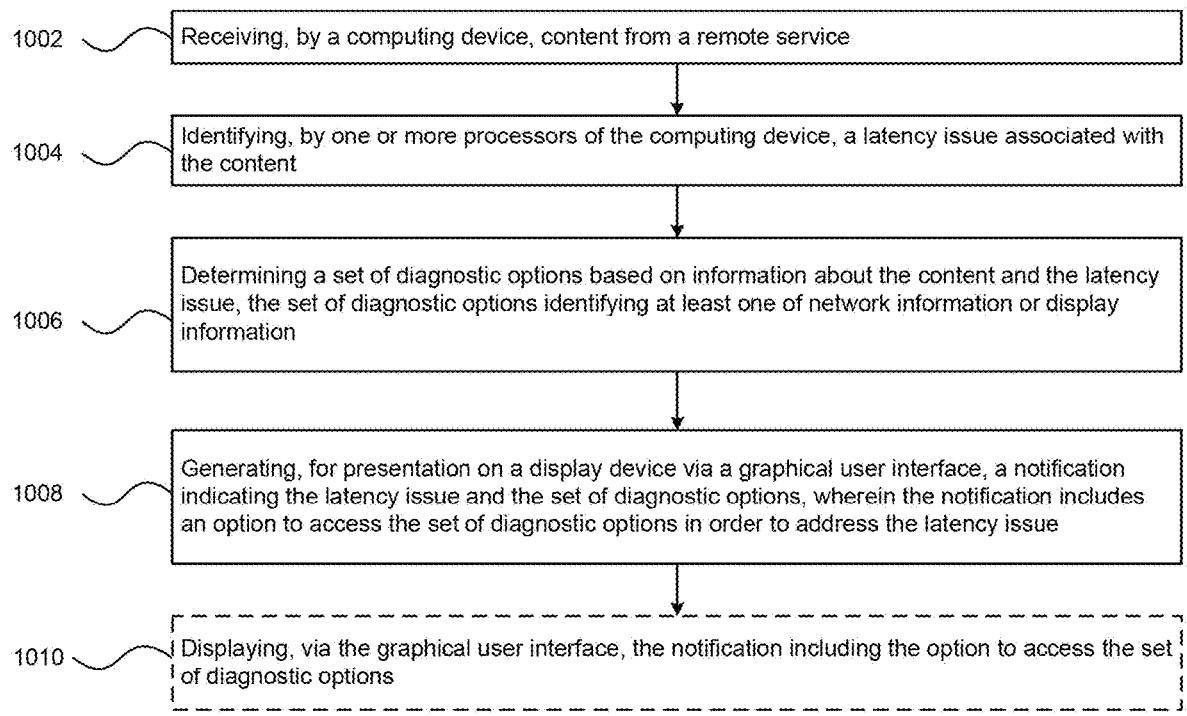

FIG. 10A illustrates an example method 1000. Method 1000 may be performed by the processing module described herein. At block 1002, the method includes receiving, by a computing device, content from a remote service. At block 1004, the method includes identifying, by one or more processors of the computing device, a latency issue associated with the content. By way of example, the latency issue may be a network latency associated with a delay occurring at the remote service or along the communication link. The latency issue may additionally or alternatively be identified based on a current state of an application associated with the content that is received from the given remote service (e.g., an active game state during play, or an inactive state such as when showing a cut scene). At block 1006, the method includes determining a set of diagnostic options based on information about the content and the latency issue, the set of diagnostic options identifying at least one of network information or display information. At block 1008, the method includes generating, for presentation on a display device via a graphical user interface, a notification indicating the latency issue and the set of diagnostic options, wherein the notification includes an option to access the set of diagnostic options in order to address the latency issue. And as shown by dashed block 1010, the method may include displaying, via the graphical user interface, the notification including the option to access the set of diagnostic options.

As shown by dashed block 1012 in FIG. 10B, the diagnostics option(s) may optionally include a connectivity metrics option. In this scenario, upon selection of the connectivity metrics option, the method may further include at least one of: generating real-time network resource information for presentation on the display device via the graphical user interface; or generating resource information associated with resources utilized by the content at the remote service (for instance how much bandwidth is required at the remote service to stream the content, or how much memory is being used to cache or otherwise buffer content resources).

FIG. 10C illustrates a variation 1020 of the method of FIG. 10A. Method 1020 may be performed by the processing module described herein. Here, as shown in dashed block 1022, the diagnostics option(s) further includes a prioritization option for the content. In this case, the prioritization option relates to at least one of network bandwidth usage or processor usage by the processing module regarding one or more display parameters. And as shown in dashed block 1024, upon selection of the prioritization option, the method may further include suspending or deprioritizing one or more other services being run on the computing device. In this way, the received content can be prioritized to minimize or avoid latency issues with the received content.

Figure 10D:
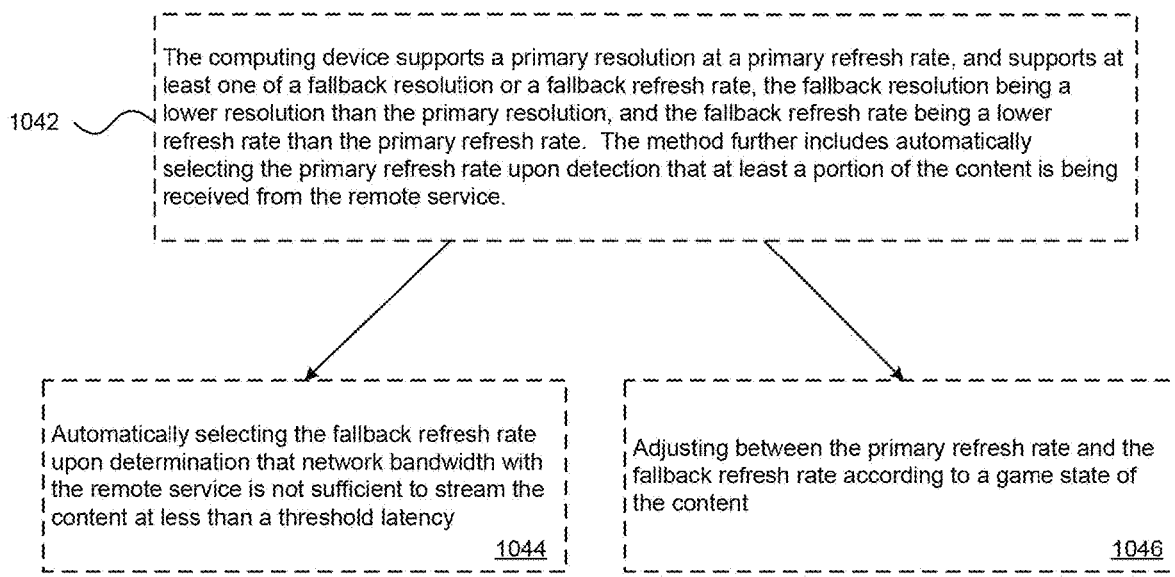

FIG. 10D illustrates another variation 1040 of the method of FIG. 10A. Method 1040 may be performed by the processing module described herein. Here, as shown in dashed block 1042, the computing device supports a primary resolution at a primary refresh rate, and supports at least one of a fallback resolution or a fallback refresh rate. The fallback resolution is a lower resolution than the primary resolution, and the fallback refresh rate is a lower refresh rate than the primary refresh rate. Here, the method further includes automatically selecting the primary refresh rate upon detection that at least a portion of the content is being received from the remote service. At block 1046, the method may further comprise automatically selecting the fallback refresh rate upon determination that network bandwidth with the remote service is not sufficient to stream the content at less than a threshold latency. And at block 1048, the method may further comprise adjusting between the primary refresh rate and the fallback refresh rate according to a game state of the content. In this way, the refresh rate can be adjusted to minimize or avoid latency issues with the received content.

FIG. 11 illustrates another example method 1100. Method 1100 may be performed by the processing module described herein. At block 1102 this method includes receiving, by a computing device, content from a remote service. At block 1104, the method includes obtaining, by one or more processors of the computing device, a user input associated with the content. At block 1106 the method includes identifying, by the one or more processors based on the user input, at least one customizable feature of a user input device of the computing device. And at block 1108 the method includes adjusting operation of the computing device according to the identified at least one customizable feature, including setting a mode to prioritize interaction with the content over one or more other functions performed by the computing device. In this way, the received content can be prioritized to minimize or avoid latency issues with the received content directly from the user input device. Improved user control may therefore be provided.

In one alternative, as shown in dashed block 1110 when the user input device is a keyboard, the method may further include causing the keyboard to illuminate according to one or more of: (1) a selected color scheme corresponding to the content, (2) a pattern corresponding to wallpaper being generated for display on a display device of the computing device, or (3) a pattern having multiple zones for different regions of the keyboard.

FIG. 12 illustrates a further example method 1200. Here, at block 1202 the method includes associating a given one of one or more customizable features with specific element of a user input device of a computing device. At block 1204 the method includes receiving, by the computing device, content from a remote service. At block 1206 the method includes identifying, by one or more processors of the computing device, selection of the given one of the one or more customizable features. And at block 1208 the method includes, in response to identifying the selection, prioritizing interaction with the content over one or more other functions performed by the computing device. As shown in dashed block 1210, the method may optionally include prioritizing the interaction with the content. This can include performing at least one of: dedicating additional computing resources to the content, removing at least some computing resources from handling the one or more other functions, powering down a component of the computing device, closing the one or more other functions, and/or suspending the one or more other functions.

While certain examples herein refer to a computing device and a mobile device performing certain operations, the technology may be used with different types of client devices, and is not limited to the specific types of devices identified in the examples. Note that the order of steps shown in the figures may be performed in a different order or in parallel, unless expressly stated otherwise herein.

Although the technology herein has been described with reference to particular implementations, it is to be understood that these implementations are merely illustrative of the principles and applications of the present technology. It is therefore to be understood that numerous modifications may be made to the illustrative implementations and that other arrangements may be devised without departing from the spirit and scope of the present technology as defined by the appended claims.

The invention claimed is:

1. A client computing device, comprising:
a communication module configured to communicate with one or more remote services;
a display module configured to send signals to a display device of the client computing device to present graphical information to a user; and
a processing module having one or more processors of the client computing device operatively coupled to the communication module and the display module, the processing module being configured to:
identify a latency issue associated with content received from a given one of the one or more remote services;
determine a set of diagnostic options based on information about the content and the latency issue, the set of diagnostic options identifying at least one of network information or display information; and
generate, for presentation on the display device of the client computing device via a graphical user interface, a notification indicating the latency issue and the set of diagnostic options, wherein the notification includes an option to access the set of diagnostic options in order to address the latency issue.

2. The client computing device of claim 1, wherein the set of diagnostic options include a connectivity metrics option.

3. The client computing device of claim 2, wherein upon selection of the connectivity metrics option, the processing module is further configured to generate real-time network resource information for presentation on the display device via the graphical user interface.

4. The client computing device of claim 2, wherein upon selection of the connectivity metrics option, the processing module is further configured to generate resource information associated with resources utilized by the content at the given remote service.

5. The client computing device of claim 1, wherein the set of diagnostic options include a prioritization option for the content.

6. The client computing device of claim 5, wherein the prioritization option for the content relates to at least one of network bandwidth usage or processor usage by the processing module regarding one or more display parameters.

7. The client computing device of claim 5, wherein upon selection of the prioritization option, the processing module is further configured to suspend or deprioritize one or more services being run on the client computing device.

8. The client computing device of claim 1, wherein the processing module is configured to identify the latency issue based on a type of the content.

9. The client computing device of claim 1, wherein the processing module is configured to identify the latency issue based on a current state of an application run by the processing module and associated with the content.

10. The client computing device of claim 1, wherein the processing module is configured to identify the latency issue based on an operational status of the given remote service.

11. The client computing device of claim 1, further comprising the display device, wherein the display device is configured to:
support a primary resolution at a primary refresh rate; and
support at least one of a fallback resolution or a fallback refresh rate, wherein the fallback resolution is a lower resolution than the primary resolution, and the fallback refresh rate is a lower refresh rate than the primary refresh rate.

12. The client computing device of claim 11, wherein the processing module is further configured to automatically select the primary refresh rate upon detection that at least a portion of the content is received from the given remote service.

13. The client computing device of claim 12, wherein the processing module is further configured to automatically select the fallback refresh rate upon determination that network bandwidth associated with the given remote service is insufficient to stream the content at less than a threshold latency.

14. The client computing device of claim 11, wherein the processing module is further configured to adjust between the primary refresh rate and the fallback refresh rate based on a type of the content.

15. The client computing device of claim 1, wherein the information about the content corresponds to at least one of: a game state of a game streamed from the given remote service, a delay associated with load balancing at the given remote service, or where data for the content is cached by the given remote service.

16. A computer-implemented method comprising:
receiving, by a client computing device, content from a remote service;
identifying, by one or more processors of the client computing device, a latency issue associated with the content;
determining, by the one or more processors, a set of diagnostic options based on information about the content and the latency issue, the set of diagnostic options identifying at least one of network information or display information; and
generating, by the one or more processors for presentation on a display device of the client computing device via a graphical user interface, a notification indicating the latency issue and the set of diagnostic options, wherein the notification includes an option to access the set of diagnostic options in order to address the latency issue.

17. The method of claim 16, wherein the set of diagnostic options includes a connectivity metrics option, and upon selection of the connectivity metrics option, the method further includes at least one of:
generating, by the one or more processors, real-time network resource information for presentation on the display device via the graphical user interface; or
generating, by the one or more processors, resource information associated with resources utilized by the content at the remote service.

18. The method of claim 16, wherein the set of diagnostic options further includes a prioritization option for the content, the prioritization option relating to at least one of network bandwidth usage or processor usage by the one or more processors regarding one or more display parameters.

19. The method of claim 18, wherein upon selection of the prioritization option, the method further includes suspending or deprioritizing, by the one or more processors, one or more services being run on the client computing device.

20. The method of claim 16, wherein:
the client computing device supports a primary resolution at a primary refresh rate, and at least one of a fallback resolution or a fallback refresh rate, the fallback resolution being a lower resolution than the primary resolution, and the fallback refresh rate being a lower refresh rate than the primary refresh rate; and
the method further includes automatically selecting, by the one or more processors, the primary refresh rate upon detection that at least a portion of the content is being received from the remote service.

21. The method of claim 20, further comprising automatically selecting, by the one or more processors, the fallback refresh rate upon determination that network bandwidth with the remote service is insufficient to stream the content at less than a threshold latency.

22. The method of claim 20, further comprising adjusting, by the one or more processors, between the primary refresh rate and the fallback refresh rate according to a current state of the content.

23. A non-transitory computer-readable recording medium having instructions stored thereon, the instructions, when executed by one or more processors of a client computing device, implement a method comprising:
receiving content from a remote service;
identifying a latency issue associated with the content;
determining a set of diagnostic options based on information about the content and the latency issue, the set of diagnostic options identifying at least one of network information or display information; and
generating, for presentation on a display device of the client computing device via a graphical user interface, a notification indicating the latency issue and the set of diagnostic options, wherein the notification includes an option to access the set of diagnostic options in order to address the latency issue.

\* \* \* \* \*